United States Patent [19]

Byer et al.

[11] Patent Number: 4,809,291
[45] Date of Patent: Feb. 28, 1989

[54] DIODE PUMPED LASER AND DOUBLING TO OBTAIN BLUE LIGHT

[75] Inventors: Robert L. Byer; Tso Y. Fan, both of Stanford, Calif.

[73] Assignee: Board of Trustees, of Leland Stanford Jr U., Stanford, Calif.

[21] Appl. No.: 907,495

[22] Filed: Sep. 15, 1986

Related U.S. Application Data

[63] Continuation-in-part of Ser. No. 674,948, Nov. 26, 1984, abandoned.

[51] Int. Cl.$^4$ ............................................. H01S 3/091
[52] U.S. Cl. ............................................ 372/75; 372/4; 372/21; 372/22; 372/39; 372/34
[58] Field of Search ....................... 372/76, 70, 21, 22, 372/41, 29, 39, 34; 378/20, 4

[56] References Cited

U.S. PATENT DOCUMENTS

| | | | |
|---|---|---|---|
| 3,316,500 | 4/1967 | Newman | 372/75 |
| 3,851,268 | 11/1974 | Singh et al. | 372/39 |
| 4,003,074 | 1/1977 | Yonezu et al. | 372/44 |
| 4,019,159 | 4/1977 | Hon et al. | 372/22 |
| 4,048,515 | 9/1972 | Liu | 378/22 |
| 4,181,899 | 1/1980 | Liu | 373/22 |
| 4,338,578 | 7/1982 | Sukhman | 372/29 |
| 4,504,950 | 3/1985 | Auyeung | 372/20 |
| 4,553,238 | 11/1985 | Shaw et al. | 372/70 |
| 4,578,793 | 3/1986 | Kane et al. | 372/94 |
| 4,653,056 | 3/1987 | Baer et al. | 372/21 |
| 4,656,635 | 4/1987 | Baer et al. | 372/21 |

OTHER PUBLICATIONS

Inoue et al, "Room-Temp. CW Operation of an Efficient Miniaturized Nd:YAG Laser End-Pumped by a SLD"; Appl. Phys Lett., vol. 29, No. 11, Dec. 7, 1976.
Volkonski et al; "McGaresonator Generation and Simultaneous Modulation of the Second-Harmonic in a YAG:Nd Laser"; Sov. J.QE, vol. 5, No. 1, Jul. '75.
Jones et al; "Milliatt-Level 213 nm Source based on a Repet. Q-Switched CW-Pumped Nd:YAG Laser"; IEEE JQE, vol. QE-15, No. 4, Apr. 1979.
Belabaen et al; "Stimulated Emission from Ferroelectric LiNbO$_3$ Crystals cont. Nd$^{3+}$ and Mg$^{2+}$ ions", Physcia Status Solid A, vol. 28, No. 1 p. k17-17 k20, 1975.

Primary Examiner—Leon Scott, Jr.
Attorney, Agent, or Firm—Harry E. Aine

[57] ABSTRACT

A source of coherent blue light comprises a diode laser for pumping a Nd$^{3+}$ doped member of lasant material disposed within an optical resonator for exciting the $^4F_{3/2}$-$^4I_{9/2}$ laser transition of a wavelength within the range of 0.870 to 0.960 μm. The laser radiation within the optical resonator is doubled by means of a doubler crystal of a non-linear, electro-optic material to produce blue light which is then extracted from the optical resonator as an output beam. A thermo-electric cooler is coupled in heat-exchanging relation with the Nd$^{3+}$ doped laser material to improve the efficiency and the doubler crystal is temperature controlled for phase matching to the laser radiation within the range of 0.870 to 0.960 μm. The diode pump laser is preferably either a GaAlAs or GaAs diode laser producing pumping radiation of a wavelength of approximately 0.810 μm. In the case of Nd:YAG end pumped laser material, the laser material is preferably doped to have a high an absorption coefficient as possible and its length is chosen to be within the range of 0.5 to 3 mm. In one embodiment, the lasant material and the non-linear, electro-optic material are disposed in separate optical resonators with the laser resonator optically decoupled from the doubler resonator for inhibiting reflection of optical power back to the laser resonator.

20 Claims, 1 Drawing Sheet

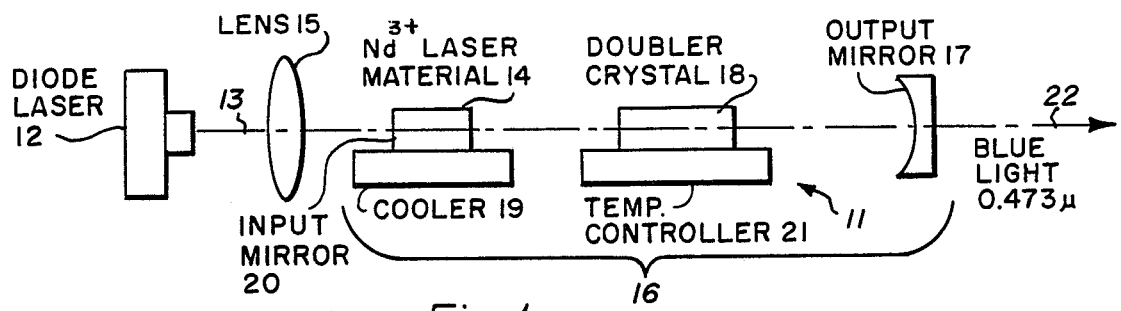
Fig_1
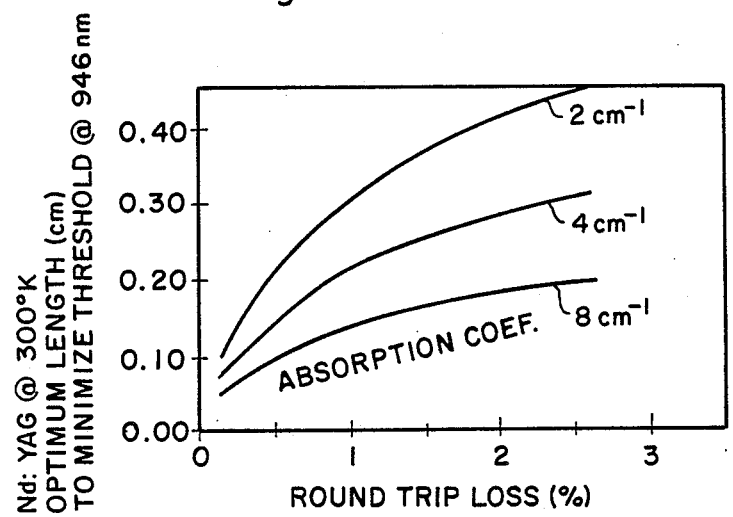
Fig_2
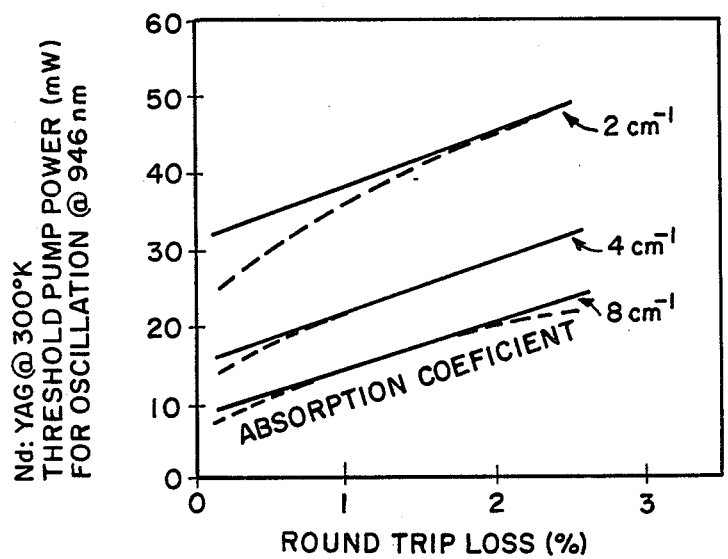
Fig_3
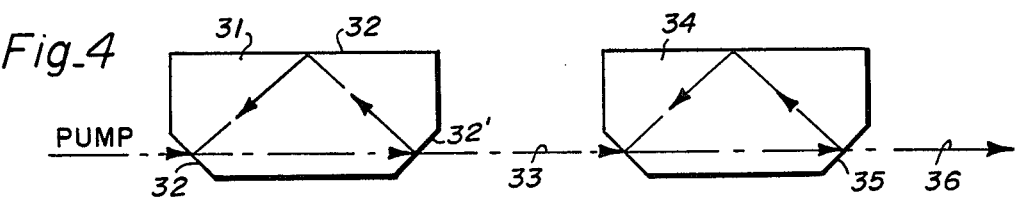
Fig_4

DIODE PUMPED LASER AND DOUBLING TO OBTAIN BLUE LIGHT

GOVERNMENT CONTRACT

The present invention was made under U.S. Office of Naval Research Contract No. N00014-83-K-0449, and the Government has certain rights therein.

RELATED CASES

The present invention is a continuation-in-part invention of U.S. Ser. No. 674,948 filed Nov. 26, 1984 now abandoned.

BACKGROUND OF THE INVENTION

The present invention relates in general to optical harmonic generators, and, more particularly, to a diode laser pumped $Nd^{3+}$ doped, solid state laser material to excite the laser transition $^4F_{3/2}$–$^4I_{9/2}$ in the wavelength region 0.870–0.960 $\mu$m which is then intracavity doubled to produce blue light.

DESCRIPTION OF THE PRIOR ART

Heretofore, coherent blue light has been provided by oscillating the $^4F_{3/2}$–$^4I_{9/2}$ transition in $Nd^{3+}$ doped laser material to produce laser oscillation at the 0.946 micron line which was then doubled in a doubling crystal contained within the laser cavity to produce coherent blue output light at a wavelength of 0.473 microns. In this laser, the $Nd^{3+}$ doped laser material was pumped by two, three-inch xenon flashlamps placed at the foci of an elliptical cylinder pump cavity. Such a source of coherent blue light is disclosed in an article entitled: "Oscillation and Doubling of the 0.946–$\mu$m Line in $Nd^{3+}$:YAG," appearing in Applied Physics Lettes, Vol. 15, No. 4 of Aug. 15, 1969, pgs. 111–112.

The problem with this flashlamp pumped laser is that it is relatively large, bulky, expensive and does not operate continuous wave, cw.

It is also known from the prior art, to reduce the size of and increase the efficiency of a $Nd^{3+}$ doped laser by end pumping the laser rod with approximately 220 mW cw at 0.810 $\mu$m derived from a GaAlAs laser diode array. This laser produced 80 mW cw power in a single mode at a wavelength of 1.06 microns with only one watt of electrical power input to the single semiconductor laser diode array pump. Such a laser is disclosed in an article entitled: "Highly efficient neodymium: yttrium aluminum garnet laser end pumped by a semiconductor laser array" appearing in Applied Physics Letters, Vol. 47, No. 2 of July 15, 1985, pgs. 74–76. This prior art laser diode pumped $Nd^{3+}$ laser is highly efficient at 1.06 $\mu$m but, there is no teaching therein of obtaining laser action on the $^4F_{3/2}$–$^4I_{9/2}$ transition, much less doubling to blue light.

It is also known from the prior art to achieve cw second-harmonic generation of green coherent light, at a wavelength of 0.525 microns, by using an intracavity electro-optic doubler crystal in a low power $Nd^{3+}$ laser pumped by a dye laser. It was speculated that green light could also be obtained by pumping the $Nd^{3+}$ laser material with light-emitting diodes or laser diodes. Such a laser is disclosed in an article entitled: "Intracavity second-harmonic generation in a Nd:pentaphosphate laser", appearing in Applied Physics Letters, Vol., 29, pgs. 176–179 (1976).

While the immediately preceding article purports to show the feasibility of obtaining green, coherent light from an intracavity electro-optic crystal in a laser diode pumped $Nd^{3+}$ laser, there is no teaching nor suggestion therein of how to obtain coherent blue light.

It has also been proposed to obtain coherent blue light by doubling the output of a 0.941 $\mu$m $Nd^{3+}$ doped laser pumped by a cw argon laser at 0.5145$\mu$. These investigators exaimed the pumping threshold for the $Nd^{3+}$ doped laser material for operation at 0.941 $\mu$m and reported that the threshold power was about 4.6 times the threshold power for operation at 1.059 $\mu$m or about 368 mW, which far exceeds the 30-40 milliwatts obtainable at 0.810 $\mu$m from a single stripe laser diode. While perhaps more power can be obtained from multistripe laser diodes, they have less brightness for optical pumping than a single stripe diode. Such a blue laser proposal is disclosed in an article entitled: "cw room-temperature laser operation of Nd:CAMGAR at 0.941 and 1.059$\mu$", appearing in Journal of Applied Physics, Vol. 49, No. 5 of May 1978, pgs. 2984–1985.

Thus, this last reference would indicate that it was not feasible to laser diode pump $Nd^{3+}$ doped laser material to produce oscillation at 0.941 $\mu$m for doubling to the blue.

There are many important applications for a solid state source of coherent, blue light. Blue light is one of the primary colors and, therefore, is useful for color projection displays. The blue radiation is also useful in color separation for photography or xerography. Blue light is useful for reading erasible, optical memory discs wherein the erase functions are performed at 0.810 $\mu$m with a red laser and the reading is obtained by means of a blue laser. A solid state blue laser could replace the argon ion laser in many applications, since the solid state blue laser would be less expensive, smaller, have a longer operating life and would be ten to one-hundred times more efficient. It would also be desired to obtain a more efficient laser operating in the infrared range of 0.870–0.960 $\mu$m.

SUMMARY OF THE PRESENT INVENTION

The principal object of the present invention is the provision of an improved infrared laser and source of coherent blue light.

In one feature of the present invention, the laser transition $^4F_{3/2}$–$^4I_{9/2}$ of a $Nd^{3+}$ doped laser medium is oscillated in the wavelength region of 0.870–0.960 $\mu$m which is then intracavity doubled in a non-linear crystal to the blue wavelength with the laser medium being pumped by a laser diode source, whereby a less expensive, smaller, longer-lived and more efficient source of coherent blue light is obtained.

In another feature of the present invention, $Nd^{3+}$ lasant material is selected from a group consisting of $Nd:YAlO_3$, $Nd:Y_3Al_5O_{12}$, $Nd:Gd_3Ga_5O_{12}$, $Nd:LiYF_4$ and $NdP_5O_{12}$, and $Nd^{3+}$ doped garnets.

In another feature of the present invention, the non-linear electro-optic doubler material is selected from the group consisting of $KNbO_3$, $KTiOPO_4$ and periodically poled $LiNbO_3$, $\beta BaB_2O_4$, and $LiIO_3$.

In another feature of the present invention, the $Nd^{3+}$ lasant material is cooled below room temperature.

In another feature of the present invention, the temperature of the non-linear, electro-optic doubler material is controlled for maintaining phase matched operation with the laser radiation from the $Nd^{3+}$ doped material.

In another feature of the present invention, a more efficient infrared laser is obtained by diode pumping and lasing the $^4F_{3/2}$–$^4I_{9/2}$ transition of a $Nd^{3+}$ doped lasant material, whereby a more efficient source of coherent, infrared radiation is obtained.

In another feature of the present invention, the laser diode is selected from the group consisting of GaAlAs and GaAs diode lasers producing pumping radiation of a wavelength within the range of 0.750–0.850 μm.

In another feature of the present invention, the pumping beam and the laser beam at 0.870–0.960 μm are essentially collinear and the pathlength through the $Nd^{3+}$ doped lasant material on the optical axis of the resonator is chosen to be in the range of 0.5 mm to 3 mm, whereby the threshold pump power is reduced for exciting the $^4F_{3/2}$–$^4I_{9/2}$ laser transition in the $Nd^{3+}$ doped lasant material.

Other features and advantages of the present invention will become apparent upon a perusal of the following specification taken in connection with the accompanying drawings wherein:

BRIEF DESCRIPTION OF THE DRAWINGS

FIG. 1, is a schematic, line diagram of a laser system incorporating features of the present invention, FIG. 2 is a plot of optimum length for a Nd:YAG laser rod to minimize pumping power threshold at 0.946 μm vs. round-trip loss of the 0.946 μm radiation within the optical resonator as a function of absorption coefficient for the YAG material, FIG. 3 is a plot of threshold pump power in mW for oscillation of the YAG at 0.946 μm vs. round-trip loss in the optical resonator at 0.946 μm as a function of absorption coefficient for the YAG rod, and FIG. 4 is a schematic, line diagram of an alternative laser system incorporating features of the present invention.

DESCRIPTION OF THE PREFERRED EMBODIMENTS

Referring now to FIG. 1, there is shown a diode laser pumped intracavity doubled blue source system 11 incorporating features of the present invention. More particularly, a diode laser pump 12, such as a GaAlAs or GaAs laser operating at a wavelength which matches the absorption bands of $Nd^{3+}$ doped laser material, produces an output pumping beam 13 which is fed into a rod of $Nd^{3+}$ doped laser material 14 via the intermediary of a focusing lens 15 which focuses the pumping radiation into the laser rod 14. In a typical example, the diode laser 12 comprises a model TOLD 500 commercially available from Toshiba Electronics producing pumping radiation at a wavelength of 0.810 μm single-mode with a power output of 30–40 milliwatts.

The $Nd^{3+}$ doped laser material is selected from the group consisting of Nd:$Y_3Al_5O_{12}$, Nd:$Gd_3Ga_5O_{12}$, Nd:$LiYF_4$, Nd:$YlO_3$ and $NdP_5O_{12}$. In a preferred embodiment, the laser material 14, is Nd:$Y_3Al_5O_{12}$ (Nd:YAG) which is commercially available from Airtron of Morris Plain, N.J. The input face of the laser material 14 is coated with a coating which is highly reflective, i.e., greater than 99.5% at the wavelength of the $^4F_{3/2}$–$^4I_{9/2}$ transition of the $Nd^{3+}$ material which is typically in the 0.870–0.960 μm wavelength region to form the input mirror 15 of an optical resonator 16. The optical resonantor 16 is a plano-concave resonator wherein the input mirror 20 is planar and an output mirror 17 includes a concave face facing into the resonator 16.

A doubler crystal 18, disposed within the optical resonator 16, is made of an electro-optic, non-linear crystal material that can phase match the doubler interaction to the fundamental wavelength which is typically in the range of 0.870–0.960 μm such as $KTiOPO_4$, $KNbO_3$, particularly poled $LiNbO_3$, $\beta$-$BaB_2O_4$, and $LiIO_3$. Suitable doubler crystals 18 are commercially available from Airtron of Morris Plains, New Jersey. A cooling device 19, such as a thermoelectric cooler, is held in heat-exchanging relation with the laser material 14 to reduce the temperature of the laser material to increase performance. A temperature controller 21, such as an oven, is coupled in heat-exchanging relation with the doubler crystal 18 to keep the non-linear crystal 18 at a phase matching temperature with the fundamental radiation emanating from the laser material 14.

The output mirror 17 is coated to be transmissive at the doubler frequency corresponding, to a wavelength of 0.473 μm which is centered in the blue region. Thus, the doubled output blue light is extracted from the resonator 16 through output mirror 17 as output beam 22.

Thus, by combining the two techniques of intracavity doubling and diode laser pumped $Nd^{3+}$ doped laser material, an all solid-state, coherent blue source is obtained having reduced size, decreased manufacturing cost, longer life and improved efficiency.

Referring now to FIGS. 2 and 3, certain optimum dimension and parameters are defined for a collinearly pumped, neodymium Nd:YAG laser material 14. More particularly, FIG. 2 shows the optimum length in centimeters to minimize the threshold pumping power for pumping the 0.946μ transition as a function of round-trip loss in the resonator 16 and the absorption coefficient for the pumping radiation in the laser material 14. FIG. 2 show that for a round-trip loss, less than 2%, the higher the absorption coefficient, the shorter the rod of laser material 14 to minimize the threshold pump power. From FIG. 2 it is seen that with reasonable absorption coefficients between 2 and 8 cm$^{-1}$ and with round-trip losses less than 2.5%, the optimum length of the YAG rod 14 varies from 0.05 to 0.4 centimeters, i.e., 0.5 mm to 4 mm.

Referring now to FIG. 3, there is shown a plot of threshold pump power in mW for oscillation at 0.946 μm of the Nd:YAG rod 1 as a function of round-trip loss and absorption coefficients. In this plot it is seen that the absorption coefficient is preferably as high as possible and the round-trip loss is preferably as low as possible. For the round-trip loss less than 2% and absorption cofficient greater than 2 cm$^{-1}$, the threshold pump requirement falls well within the 30–40 milliwatts (mW) range obtainable from single diode laser 12 of the aforecited type. The solid straight lines in the plot of FIG. 3, are for a YAG rod of a length l., equal to the inverse of the absorption coefficient, i.e. l=1/α whereas the broken lines are for a cavity of optimized length from the plot of FIG. 2. Thus, from FIG. 3 it is seen that by making the laser rod 14 of a length equal to the inverse of the absorption coefficient that nearly optimum results are obtained.

As thus far described, the laser doubling system 11 has been described with the laser material 14 being collinearly pumped, i.e., the pumping beam is collinear with the optical axis of the resonator 16. This is not a requirement, other pumping schemes have an array of diode lasers 12 pumping the laser material from the side, i.e., from a direction orthogonal to the optical axis of the resonator 16.

Also, it is not a requirement that the laser material 14 be dispersed in the same optical resonator 16 as that containing the doubling crystal 18. Such an alternative doubling system is shown in FIG. 4 wherein the optical pumping radiation at 0.810 μm is fed into a first optical ring resonator 31 of the type disclosed in U.S. Pat. No. 4,578,793 issued Mar. 25, 1986, the disclosure of which is hereby incorporated by reference in its entirety. The ring resonator 31 is made of the $Nd^{3+}$ doped lasant material and includes a plurality of internally reflective surfaces 32 to cause the lasant radiation at 0.870 to 0.960 μm to be reflected around in a closed path (ring), thereby building up the power density at the lasant wavelength corresponding to the $^4F_{3/2}$–$^4I_{9/2}$ transition. One face 32' is partially transmissive at the lasant transition wavelength to form an output beam 33 which is thence coupled into a second optical ring resonator 34 resonant at the lasant transition wavelength and made of the non-linear, electro-optic material for doubling the laser output to the blue wavelengths. As in the case of resonator 31, an output face 35 is partially transmissive at the blue wavelength to couple energy out as output beam 36.

The advantages of the laser doubling system of FIG. 4 include, single-mode output, and improved amplitude stability due to the decoupling of the doubling process from the lasing process because power is not reflected from the second optical resonator 34 back into the laser resonator 31.

Also, the $Nd^{3+}$ laser portion of the doubling system operating on the $^4F_{3/2}$–$^4I_{9/2}$ transition has the advantage of improved efficiency, i.e., up to 10–15% increased efficiency, when compared with $Nd^{3+}$ laser operating at the 1.06 μm transition, particularly when cooled below room temperature.

What is claimed is:

1. In a method for generating coherent blue light, the steps of:
   generating a beam of optical pumping radiation of a first optical wavelength from a semiconductive diode;
   directing the beam of optical pumping radiation derived from the diode into a $Nd^{3+}$ doped member of lasant material disposed in an optical resonator for efficient, optical pumping of the lasant material to excite optical lasant radiation at a second wavelength corresponding to the $^4F_{3/2}$–$^4I_{9/2}$ laser transition having a wavelength in the range of 0.870–0.960 μm;
   reflecting the lasant radiation at said second wavelength between reflectors of said optical resonator containing said member of lasant material and through said optically pumped member of lasant material for exciting said optical resonator with coherent, optical radiation at said second wavelength; and
   interacting the coherent, optical radiation at said second wavelength with a non-linear, electro-optic material within an optical resonator to generate coherent, optical radiation at a third wavelength which is the second harmonic of said second wavelength, thereby producing coherent blue light.

2. The method of claim 1 including the step of selecting the member of lasant material from the group consisting of $Nd:YAlO_3$, $Nd:Y_3Al_5O_{12}$, $Nd:Gd_3Ga_5O_{12}$, $Nd:LiYF_4$, $NdP_5O_{12}$, and $Nd^{3+}$ doped garnets.

3. The method of claim 1 including the step of selecting the non-linear, optical material from the group consisting of $KNbO_3$, $KTiOPO_4$, periodically poled $LiNbO_3$, $\beta$-$BaB_2O_4$, and $LiIO_3$.

4. The method of claim 1 including the step of cooling the member of lasant material to below room temperature.

5. The method of claim 1 including the step of controlling the temperature of the non-linear, electro-optic material for maintaining phase matched doubling operating with the lasant radiation at the second wavelength.

6. The method of claim 1 including the step of selecting said optical pumping radiation to have a wavelength in the range of 0.750 to 0.860 μm.

7. The method of claim 1 including the step of selecting said diode from the group consisting of GaAlAs and GaAs diode lasers.

8. The method of claim 1 including the step of making the pathlength through the lasant material on the optical axis of the resonator to be in the range of 0.5 millimeters to 3 millimeters and directing the pump radiation collinearly of the optical axis of the optical resonator.

9. The method of claim 1 including the step of containing said non-linear, electro-optic material in one optical resonator and exciting said one optical resonator with lasant radiation derived from another optical resonator containing said lasant material.

10. An apparatus for harmonically generating coherent blue light from a non-linear electro-optic material:
    diode means for generating a beam of coherent, optical pumping radiation of a first optical wavelength from a semiconductive diode;
    a member of $Nd^{3+}$ doped lasant material disposed to receive the beam of optical pumping radiation for optical pumping of said member of lasant material to excite optical lasant radiation at a second wavelength corresponding to the $^4F_{3/2}$–$^4I_{9/2}$ laser transition having a wavelength within the range of 0.870 to 0.960 μm;
    optical resonator means optically coupled to the lasant radiation at said second wavelength for exciting said optical resonator with coherent optical radiation at said second wavelength; and
    non-linear, electro-optic means disposed in said optical resonator means for non-linear, electro-optic interaction with the coherent optical radiation at said second wavelength to generate coherent optical radiation at the second harmonic of said second wavelength, thereby producing coherent blue light.

11. The apparatus of claim 10 wherein said member of lasant material is selected from the group consisting of $Nd:YAlO_3$, $Nd:Y_3Al_5O_{12}$, $Nd:Gd_3Ga_5O_{12}$, $Nd:LiYF_4$, $NdP_5O_{12}$, and $Nd^{3+}$ doped garnets.

12. The apparatus of claim 10 wherein said non-linear, electro-optic material is selected from the group consisting of $KNbO_3$, $KTiOPO_4$, periodically poled $LiNbO_3$, $\beta$-$BaB_2O_4$, and $LiIO_3$.

13. The apparatus of claim 10 including means for cooling the member of lasant material to below room temperature.

14. The apparatus of claim 10 including means for controlling the temperature of the non-linear, electro-optic material for maintaining phase match doubling operation with the lasant radiation at the second wavelength.

15. The apparatus of claim 10 wherein said optical pumping radiation has a wavelength in the range of 0.750 to 0.860 μm.

16. The apparatus of claim 10 wherein said diode is selected from the group consisting of GaAlAs and GaAs diode lasers.

17. The apparatus of claim 10 wherein the lasant material is disposed in an optical resonator means and the pathlength through the lasant material on the optical axis of said optical resonator means is chosen to be in the range of 0.5 mm to 3 mm and the pump radiation is directed generally collinearly of the optical axis of said optical resonator means containing said lasant material.

18. The apparatus of claim 10 including second optical resonator means containing said lasant material, and said optical resonator means containing said non-linear, electro-optic material is optically coupled to and excited by lasant radiation derived from said second optical resonator means.

19. In a method for generating coherent infrared light, the steps of:
   generating a beam of optical pumping radiation of a first optical wavelength from a semiconductive diode;
   directing the beam of optical pumping radiation derived from the diode into a $Nd^{3+}$ doped member of lasant material disposed in an optical resonator for efficient optical pumping of the lasant material to excite optical lasant radiation at a second wavelength corresponding to the $^4F_{3/2}$–$^4I_{9/2}$ laser transition having a wavelength in the range of 0.870–0.960 μm; and
   reflecting the lasant radiation at said second wavelength between reflectors of said optical resonator containing said member of lasant material and through said optically pumped member of lasant material for exciting said optical resonator with coherent, optical radiation at said second wavelength.

20. An apparatus for generating coherent, infrared light:
   diode means for generating a beam of coherent, optical pumping radiation of a first optical wavelength from a semiconductive diode;
   a member of $Nd^{3+}$ doped lasant material disposed to receive the beam of optical pumping radiation for optical pumping of said member of lasant material to excite optical lasant radiation at a second wavelength corresponding to the $^4F_{3/2}$–$^4I_{9/2}$ laser transition having a wavelength within the range of 0.870 to 0.960 μm; and
   optical resonator means optically coupled to the lasant radiation at said second wavelength for exciting said optical resonator with coherent optical radiation at said second wavelength.

* * * * *

UNITED STATES PATENT AND TRADEMARK OFFICE
CERTIFICATE OF CORRECTION

PATENT NO. : 4,809,291

DATED : February 28, 1989

INVENTOR(S) : Byer et al.

It is certified that error appears in the above-identified patent and that said Letters Patent is hereby corrected as shown below:

Column 3, line 58, change "$Nd:YlO_3$" to -- $Nd:YAlO_3$ --.

Column 4, line 8, change "particularly" to -- periodically --.

IN THE CLAIMS:

Column 5, line 68, change "$Nd:LiFY_4$" to -- $Nd:LiYF_4$ --.

Signed and Sealed this

Twenty-third Day of April, 1991

Attest:

HARRY F. MANBECK, JR.

*Attesting Officer*  *Commissioner of Patents and Trademarks*